United States Patent [19]

Kinoshita

[11] 4,183,420
[45] Jan. 15, 1980

[54] GAS TURBINE ENGINE CONTROL SYSTEM
[75] Inventor: Keijiro Kinoshita, Yokohama, Japan
[73] Assignee: Nissan Motor Company, Limited, Yokohamo, Japan
[21] Appl. No.: 867,875
[22] Filed: Jan. 9, 1978

Related U.S. Application Data

[62] Division of Ser. No. 715,834, Aug. 19, 1976.

[30] Foreign Application Priority Data

Aug. 20, 1975 [JP] Japan .............................. 50-101006

[51] Int. Cl.² .............................................. G60K 5/02
[52] U.S. Cl. ................................. 180/301; 60/39.14; 60/414; 180/65 A
[58] Field of Search ................. 180/66 A, 66 C, 65 D; 60/39.14, 414, 413, 418

[56] References Cited

U.S. PATENT DOCUMENTS

| | | | |
|---|---|---|---|
| 1,320,485 | 11/1919 | Maw et al. | 60/414 |
| 3,488,947 | 1/1970 | Miller et al. | 180/66 A X |
| 3,499,163 | 3/1970 | Verrault | 180/65 D X |
| 3,525,874 | 8/1970 | Toy | 180/65 A X |
| 3,903,696 | 9/1975 | Carman | 60/414 |

Primary Examiner—Joseph F. Peters, Jr.
Assistant Examiner—Milton L. Smith

[57] ABSTRACT

A pump or generator is connected to the drive shaft of a vehicle to induce a braking effect not provided by the twin shaft gas turbine powering the vehicle. The output of the pump or generator is stored and used to drive the compressor of the turbine in place of fuel during coasting and/or idling of the vehicle.

4 Claims, 3 Drawing Figures

GAS TURBINE ENGINE CONTROL SYSTEM

This is a division, of application Ser. No. 715,834, filed Aug. 19, 1976.

The present invention relates generally to an automotive vehicle driven by a twin shaft gas turbine and more particularly to a control system for such a twin shaft gas turbine which selectively connects an energy producing device to the output shaft of the vehicle to induce an engine braking effect, which stores the energy thus produced and which subsequently uses the stored energy in place of fuel during certain modes of vehicle operation to maintain the rotational speed of the turbine compressor.

As is well known in the art, a twin shaft type gas turbine engine is suitable for powering a motor vehicle since it has superior rotational speed versus torque characteristics as compared with that of a single shaft type gas turbine engine, but it suffers from the drawbacks that it cannot provide a suitable braking effect and fuel consumption is excessive during idling and coasting of the engine.

For increasing the effectiveness of the engine braking effect produced by a twin shaft type gas turbine engine, measures such as reversing the direction of a variable nozzle or interposing a clutch between a compressor turbine and a power turbine, have been proposed but have failed to provide sufficient and/or effective engine braking and have unduly complicated the construction of the engine.

Further since it is necessary to maintain idling speed of the gas turbine engine at a high speed to the extent of about half of the maximum speed of the engine so as to minimize the time necessary to accelerate the engine to ensure the operational performance of a motor vehicle equipped with the engine and since it is necessary to continue to drive or rotate a gas producing section (a compressor and a turbine) of the engine by supplying fuel even during coasting of the vehicle, no suitable measure for reducing fuel consumption has been thus far realized.

It is, therefore, an object of the invention to provide a control system for a gas turbine engine which comprises an energy producing device driven by a motor vehicle equipped with the engine to produce energy and means for utilizing said energy for operation of the engine in lieu of fuel so that an engine braking effect for decelerating the vehicle is provided and fuel consumption of the turbine is reduced.

This and other objects and advantages of the invention will become more apparent from the following detailed description taken in connection with the accompanying drawings in which.

Figure 1:
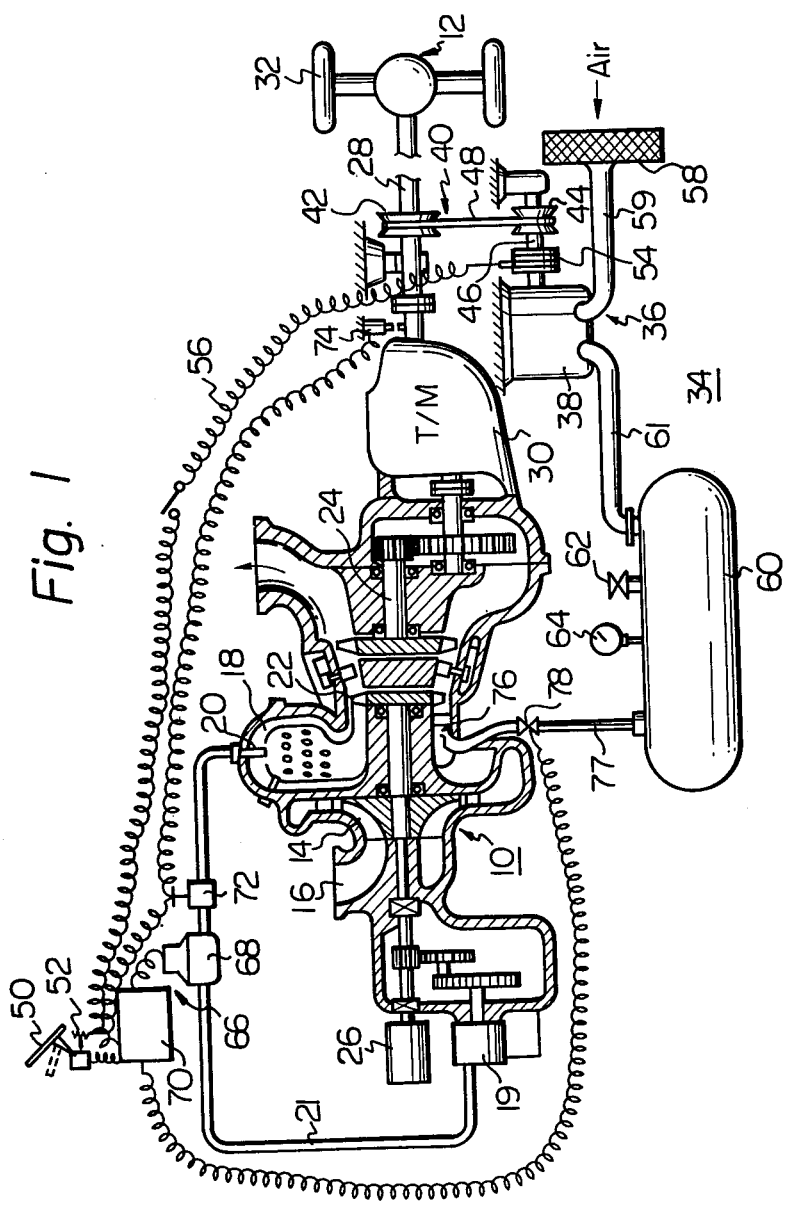
FIG. 1 is a schematic view of a first preferred embodiment of a control system according to the invention.

Referring to FIG. 1 of the drawings, there is shown schematically a twin shaft type gas turbine engine 10 for a motor vehicle 12 and a control system according to the invention which is combined with the gas turbine engine 10. The gas turbine engine 10 is shown to include a compressor 14 which is rotated to draw air from an inlet port 16 and to produce compressed air, a combustion chamber 18 into which the compressed air is forced, a fuel pump 19 to discharge fuel under pressure, and a fuel injecting valve 20 communicating with the fuel pump 19 through a conduit 21 and opening into the combustion chamber 18 and injecting fuel under pressure from the fuel pump 19 thereinto. The fuel is mixed with the compressed air and is burned in the combustion chamber 18 to produce combustion gas. The combustion gas is fed into a turbine 22 in which it expands and the heat energy is converted into rotational energy to turn an output shaft 24. A starting motor 26 is provided to drive the compressor 14 for permitting starting of the gas turbine engine 10. The vehicle 12 is shown to include a propeller shaft 28 connected to the input shaft 24 through a transmission 30, and rear wheels 32 driven by the propeller shaft 28.

The control system, generally designated by the reference numeral 34, comprises means 36 for imparting an engine braking effect for retarding or decelerating the vehicle 12 to the gas turbine engine 10. The means 36 comprises an energy producing device 38 which is driven by a drive shaft for driving the vehicle 12 to produce an energy which is stored for use, and drive means 40 for driving the energy producing device 38. The energy producing device 38 comprises in this embodiment an air compressor. The compressor 38 is, for example, a displacement compressor such as of Roots or vane type. The drive means 40 comprises a drive pulley 42 fixedly mounted on the propeller shaft 28 of the vehicle 12, a driven pulley 44 fixedly mounted on a drive shaft 46 for driving the compressor 38, and a belt 48 for connecting the drive pulley 42 to the driven pulley 44. The compressor 38 is driven by the propeller shaft 28 through the drive means 40 to produce compressed air so that an engine braking effect is provided to decelerate the vehicle 12. Drive control means is provided to prevent the gas turbine engine 10 from being resisted by the operation of the compressor 38 when an accelerator pedal 50 of the vehicle 12 is depressed (as during acceleration and steady operation). The drive control means comprises means 52 for sensing the degree of depression of the accelerator pedal 50. An electromagnetic clutch 54 mounted on the drive shaft 46 to control the connection between the compressor 38 and the driven pulley 44 is electrically connected to the sensing means 52 through an electric wire 56. The sensing means 52 demagnetizes the electromagnetic clutch 54 to disconnect the compressor 38 from the driven pulley 44 to prevent the compressor 38 from being driven when the accelerator pedal 50 is depressed and magnetizes the electromagnetic clutch 54 to connect the compressor 38 to the driven pulley 44 when the accelerator pedal 50 is not depressed.

The retarder means 36 further comprises an air cleaner 58 communicating with an inlet port (not shown) of the compressor 38 through a conduit 59 and a compressed air reservoir or accumulator 60 communicating with an outlet port (not shown) of the compressor 38 through a conduit 61. Compressed air is discharged from the compressor 38 and stored in the reservoir 60. A relief valve 62 is provided on the reservoir 60 for releasing air from the reservoir 60 into the atmosphere when the pressure of air in the reservoir 60 exceeds a preset value. A pressure gauge 64 of the reservoir 60 is provided in a driver compartment (not shown) of the vehicle 12 for observation by the driver.

The control system 34 further comprises means 66 for interrupting the supply of fuel to the fuel injector 20 when the vehicle 12 is coasting or is travelling with the accelerator pedal 50 released and/or when the vehicle 12 is at a standstill. The means 66 comprises a control valve 68 disposed in the conduit 21, and a controller 70 for controlling the degree of opening of the control valve 68 in accordance with the degree of depression of the accelerator pedal 50. The controller 70 closes the control valve 68 to reduce the amount of fuel fed to the fuel injector 20 to zero when the accelertor pedal 50 is released. A second control valve 72 may be disposed in the conduit 21 downstream of the first control valve 68 to close the conduit 21 when the speed of the vehicle 12 is below a predetermined value such as, for example, 30 to 40 Km/hr with the accelerator pedal 50 released. The second control valve 72 has a solenoid (not shown) for operating it and a sensor 74 electrically connected to the solenoid and responsive to the speed of the vehicle 12 below the predetermined value to produce an output signal which is fed to the solenoid to energize it to close the second control valve 72. In this instance, the first control valve 68 is controlled by the controller 70 to open the conduit 21 a minimum amount when the accelerator pedal 50 is released and the speed of the vehicle 12 is above the predetermined value.

The control system 34 further comprises means for utilizing the energy produced by the energy producing device 38 for operation of the engine 10 in lieu of fuel. The means comprises in this embodiment a nozzle 76 communicating with the compressed air reservoir 60 through a conduit 77 and opening into the gas turbine engine 10 to inject compressed air against the turbine 22. A safety valve 78 is disposed in the conduit 77 to permit the compressed air to pass to the nozzle 76 only when the pressure of air in the reservoir 60 is above a predetermined value and to block the conduit 77 when the pressure of air in the reservoir 60 is below the preset value. The injection of compressed air from the nozzle 76 against the turbine 22 serves to prevent the rotation of the compressor 14 and the turbine 22 from stopping when the supply of fuel into the combustion chamber 18 is cut off and to make it possible to quickly accelerate the vehicle 12 without delay and without using the starting motor 26 when the accelerator pedal 50 is depressed during coasting operation thereof; and further to maintain idling of the engine 10 to make it possible to quickly start the vehicle 12 without delay and without using the starting motor 26 when the vehicle 12 is temporarily at a standstill. The controller 70 may be electrically connected to the safety valve 78 to open it even if the pressure of air in the reservoir 60 is below the last-mentioned predetermined value when the controller 70 closes the first control valve 68.

Figure 2:
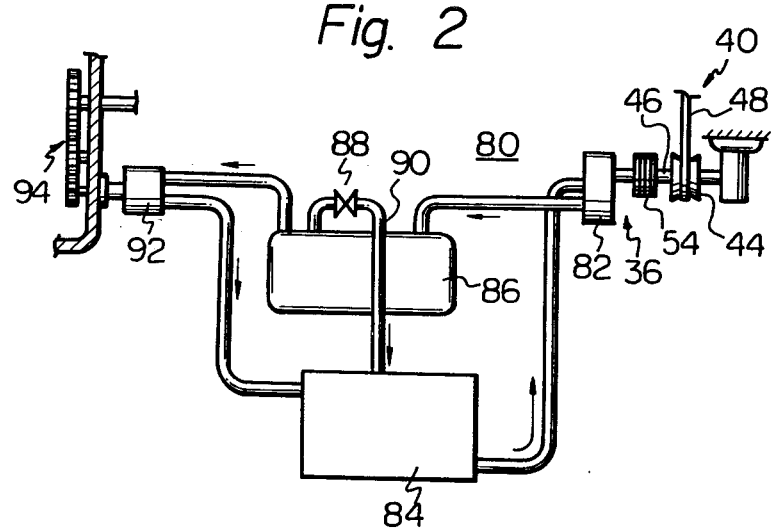
FIG. 2 is a schematic view of a part of a second preferred embodiment of a control system according to the invention.

Referring to FIG. 2 of the drawings, there is shown a part of a second preferred embodiment of a control system according to the invention. The control system 80 is characterized in that the means 36 comprises for inducing a braking effect comprises a hydraulic fluid pump 82 in lieu of the compressor 38 of the control system 34 shown in FIG. 1. In FIG. 2, like component elements are designated by the same reference numerals as those used in FIG. 1. The hydraulic fluid pump 82 is driven by the drive means 40 to produce pressurized hydraulic fluid so that an engine braking effect induced thereby, decelerates the vehicle 12. The means 36 also comprises a hydraulic fluid tank or reservoir 84 communicating with an inlet port (not shown) of the pump 82 and from which hydraulic fluid is drawn by the pump 82, and a pressurized hydraulic fluid reservoir 86 communicating with an outlet port (not shown) of the pump 82 and into which pressurized hydraulic fluid is discharged from the pump 82. A relief valve 88 is disposed in a conduit 90 to open it to release hydraulic fluid into the tank 84 when the pressure of hydraulic fluid in the reservoir 86 is above a predetermined value. In lieu of the nozzle 76 of the control system 34 of FIG. 1, a hydraulic fluid motor 92 is provided which communicates with the reservoir 86 to receive the pressurized hydraulic fluid therefrom and with the tank 84 to drain hydraulic fluid used in the motor 92 thereinto. A gear arrangement 94 is provided which operatively connects the motor 92 to a drive shaft of the compressor 14 and the turbine 22. The gearing 94 is rotated by the operation of the motor 92 to maintain the rotation of the compressor 14 and the turbine 22 to make it possible to quickly accelerate the engine 10 when the vehicle 12 is coasting and to permit the engine 10 to idle to make it possible to quickly start the vehicle 12 when the vehicle 12 is temporarily at a standstill, similarly as described above.

Figure 3:
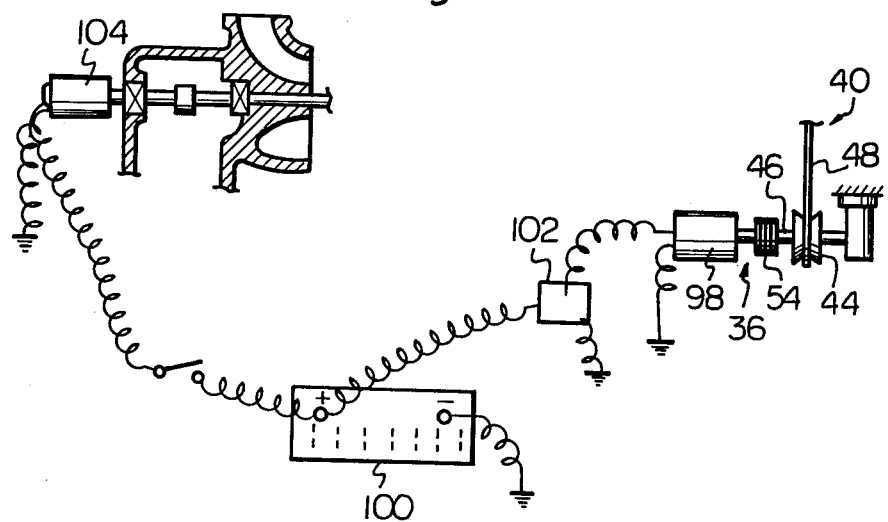
FIG. 3 is a schematic view of a part of a third preferred embodiment of a control system according to the invention.

Referring to FIG. 3 of the drawings, there is shown a part of a third preferred embodiment of a control system according to the invention. The control system 96 is characterized in that the means 36 comprises a generator 98 in lieu of the compressor 38 of the control system 34 of FIG. 1. In FIG. 3, like component elements are designated by the same reference numerals as those used in FIG. 1. The generator 98 is driven by the drive means 40 to produce electric power so that an engine braking effect thus produced decelerates the vehicle 12. A storage battery 100 is provided which is electrically connected to the generator 98 through a regulator 102 and is charged by the electric energy produced by the generator 98. In lieu of the nozzle 76 of the control system 34 of FIG. 1, an electric motor, which may also serve as the starting motor is provided which is electrically connected to the battery 100. The motor 104 is operatively connected to a drive shaft of the compressor 14 and the turbine 22 and is rotated by the electric power from the battery to maintain the r.p.m. of the compressor 14 and the turbine the vehicle 12 is coasting and/or is temporarily at a standstill.

It was confirmed by an experiment that, when a motor vehicle equipped with a twin shaft gas turbine engine is freewheeling fuel consumption drops by about 15%. To prevent any conflict between the fuel economy afforded by the present invention and the just mentioned reduction in fuel consumption, the supply of fuel to the combustion chamber 18 is cut off and the energy producing device 38 is disconnected from drive means of the vehicle 12 such as the propeller shaft 28 to be inoperative, for example, by demagnetizing the electromagnetic clutch 54 when the vehicle 12 is freewheeling at a speed above a predetermined value, for example, such as 40 Km/hr, and the fuel supply is cut off and the energy producing device 38 is connected to the vehicle 12 to be driven thereby, for example, by magnetizing the electromagnetic clutch 54 when the speed drops below the predetermined value.

It will be appreciated that the invention provides a control system for an automotive gas turbine engine which comprises an energy producing device driven to induce an engine braking effect and thus function as a brake to decelerate the vehicle, means for cutting off the supply of fuel to a combustion chamber of the engine during coasting of the vehicle and/or when the vehicle is temporarily at a standstill or the engine is idling, and means for feeding the stored energy to the engine in lieu of said fuel during coasting of the vehicle and/or during idling of the engine to maintain the rotation of a compressor and a power turbine of the engine. This arrangement increases the effectiveness of the engine braking for the vehicle reduces the load on the vehicle brakes and reduces the fuel consumption of the engine.

What is claimed is:

1. In an automotive vehicle,
a twin shaft type gas turbine having a combustor, a compressor and an output shaft connectable to a drive shaft of the vehicle via a clutch;
energy producing means for producing a storable energy;
first drive means for providing temporary drive connection between said drive shaft of said vehicle and said energy producing means to produce an engine braking effect to induce deceleration of said vehicle;
storage means connected to said energy producing means for receiving and storing said storable energy;
second drive means connected to said compressor for maintaining the rotational speed of said compressor above a predetermined level upon being supplied with said storable energy stored in said storage means; and
control means for selectively causing said first drive means to provide said temporary drive connection between said drive shaft and said energy producing means, supplying said second drive means with said storable energy stored in said storage means and cutting the supply of fuel to the combustor of said turbine.

2. In an automotive vehicle,
a twin shaft type gas turbine having a combustor, a compressor and an output shaft connectable to a drive shaft of the vehicle via a clutch;
a hydraulic pump for pressurizing hydraulic fluid;
first drive means for providing temporary drive connection between said drive shaft of said vehicle and said pump to produce an engine braking effect to induce deceleration, said first drive means being disabled when the rotational speed of said output shaft is above a predetermined level;
reservoir means connected to said pump for storing pressurized hydraulic fluid from said pump therein;
a hydraulic motor in drive connection with said compressor for driving said compressor to maintain the rotational speed of said compressor above a predetermined level upon being supplied with said pressurized hydraulic fluid; and
control means for selectively causing said first drive means to provide said drive connection, supplying said hydraulic motor with pressurized hydraulic fluid from said reservoir means and cutting the supply of fuel to the combustor of said turbine.

3. In an automotive vehicle,
a twin shaft type gas turbine having a combustor, a compressor and an output shaft connectable to a drive shaft of the vehicle via a clutch;
electric current generating means for producing an electric current;
first drive means for providing temporary drive connection between said drive shaft and said electric current generating means, said first drive means being disabled when the rotational speed of said output shaft is above predetermined level;
electric storage means connected to said electric current generating means for receiving and storing electric current;
second drive means in drive connection with said compressor for driving said compressor and maintaining the rotational speed of said compressor above a predetermined level upon being supplied with electric current from said electric storage means; and
control means for selectively causing said first drive means to provide said temporary drive connection, for supplying electric current to said second drive means and cutting the supply of fuel to said combustor.

4. In a method of operating a twin shaft type gas turbine for an automotive vehicle, said turbine having a combustor, a compressor and an output shaft connectable to a drive shaft of said vehicle via a clutch, the steps of:
connecting means for producing a storable energy to said drive shaft of said vehicle via first drive means to induce an engine braking effect;
storing said storable energy in energy storage means;
disabling said first drive means when the rotational speed of said output shaft is above a predetermined level; and
cutting the supply of fuel to said combustor and supplying said stored energy to second drive means in drive connection with said compressor to maintain the rotational speed of said compressor above a predetermined level, during coasting and idling of said vehicle.

* * * * *